(12) United States Patent
Gerstenkamp

(10) Patent No.: US 11,259,902 B2
(45) Date of Patent: Mar. 1, 2022

(54) METHOD FOR VIRTUALLY MODELING A DENTAL ARCH

(71) Applicant: Gustav Gerstenkamp, Hann.Muenden (DE)

(72) Inventor: Gustav Gerstenkamp, Hann.Muenden (DE)

(*) Notice: Subject to any disclaimer, the term of this patent is extended or adjusted under 35 U.S.C. 154(b) by 72 days.

(21) Appl. No.: 16/764,373

(22) PCT Filed: Oct. 24, 2018

(86) PCT No.: PCT/EP2018/079196
§ 371 (c)(1),
(2) Date: May 14, 2020

(87) PCT Pub. No.: WO2019/096555
PCT Pub. Date: May 23, 2019

(65) Prior Publication Data
US 2020/0268486 A1  Aug. 27, 2020

(30) Foreign Application Priority Data
Nov. 17, 2017  (DE) .................. 10 2017 127 128.7

(51) Int. Cl.
*A61C 9/00* (2006.01)
(52) U.S. Cl.
CPC .......... *A61C 9/0053* (2013.01); *A61C 9/0006* (2013.01)
(58) Field of Classification Search
CPC ..................... A61C 9/0053; A61C 9/0006
See application file for complete search history.

(56) References Cited

U.S. PATENT DOCUMENTS

| 6,621,491 | B1* | 9/2003 | Baumrind | A61C 9/0046 345/419 |
| 6,948,936 | B2* | 9/2005 | Miller | A61C 11/00 433/214 |
| 10,098,714 | B2* | 10/2018 | Kuo | A61C 13/34 |
| 2003/0065259 | A1* | 4/2003 | Gateno | A61B 17/6433 600/425 |
| 2004/0229185 | A1* | 11/2004 | Knopp | A61C 7/146 433/24 |

(Continued)

FOREIGN PATENT DOCUMENTS

| DE | 10 2011 005 802 | 9/2012 |
| DE | 10 2012 214 470 | 2/2014 |

(Continued)

OTHER PUBLICATIONS

International Search Report dated Feb. 18, 2019.

*Primary Examiner* — Nicholas D Lucchesi
(74) *Attorney, Agent, or Firm* — Gerald E. Hespos; Michael J. Porco; Matthew T. Hespos

(57) ABSTRACT

The invention relates to a method for virtually modeling a dental arch (10), wherein a plurality of overlapping images of the dental arch (10) and of a reference body (30) is captured from different angles of view and a virtual, three-dimensional dental arch model is computed from the captured images.
The invention is characterized in that a partial impression (32) of the dental arch (10) on an impression plate (22) of known dimensions is used as the reference body (30), which impression plate is provided with a pattern.

9 Claims, 3 Drawing Sheets

(56) References Cited

U.S. PATENT DOCUMENTS

| | | | |
|---|---|---|---|
| 2005/0089822 A1* | 4/2005 | Geng | A61C 13/0004 |
| | | | 433/215 |
| 2005/0153257 A1 | 7/2005 | Durbin et al. | |
| 2005/0271996 A1* | 12/2005 | Sporbert | A61C 7/00 |
| | | | 433/24 |
| 2007/0031791 A1* | 2/2007 | Cinader | A61C 7/146 |
| | | | 433/213 |
| 2007/0190481 A1 | 8/2007 | Schmitt | |
| 2012/0237892 A1 | 9/2012 | Lang | |
| 2015/0235412 A1 | 8/2015 | Adamson et al. | |
| 2016/0000526 A1 | 1/2016 | Tam et al. | |

FOREIGN PATENT DOCUMENTS

| | | |
|---|---|---|
| DE | 10 2014 102 770 | 9/2015 |
| DE | 20 2015 105 356 | 11/2016 |
| WO | 03/100729 | 12/2003 |
| WO | 2016/110855 | 7/2016 |

* cited by examiner

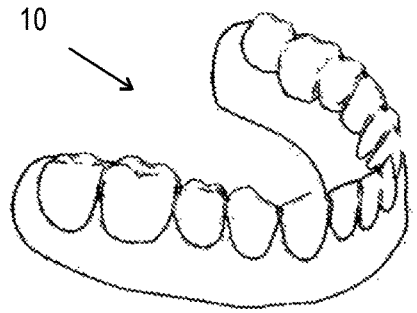
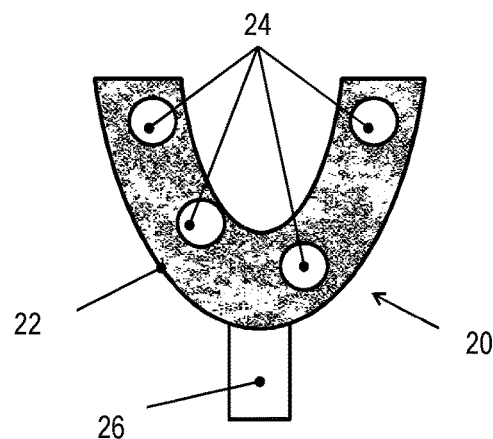
*Fig. 1(a)*        *Fig. 1(b)*
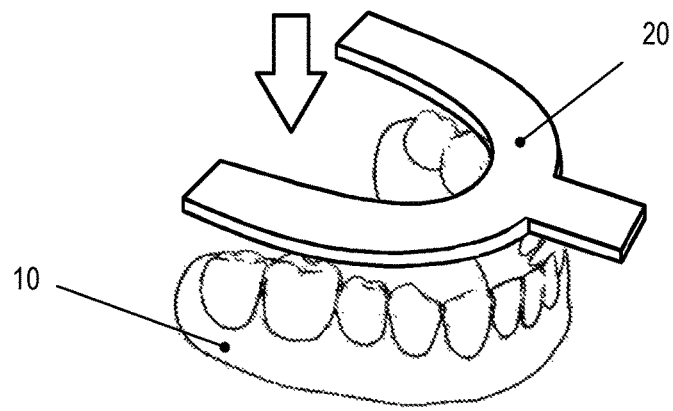
*Fig. 2*
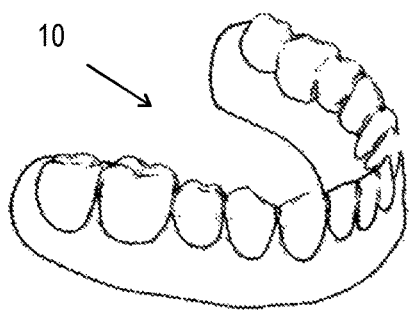
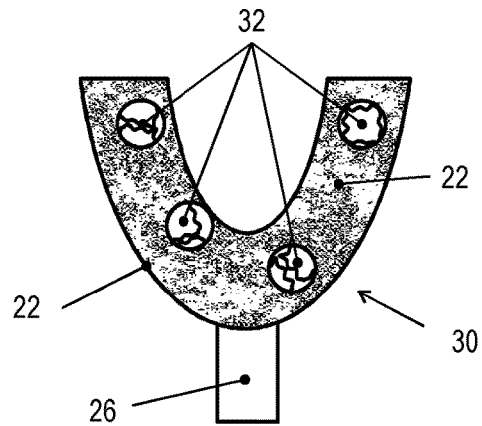
*Fig. 3(a)*        *Fig. 3(b)*

METHOD FOR VIRTUALLY MODELING A DENTAL ARCH

BACKGROUND

Field of the Invention

The invention relates to a method for virtually modeling a dental arch, wherein a plurality of overlapping images of the dental arch and of a reference body is captured from different angles of view and a virtual, three-dimensional dental arch model is computed from the captured images.

Related Art

WO 03/100 729 A1 discloses a known method for virtually modeling a dental arch.

In dentistry, especially jaw surgery and dental prosthetics, exact dental arch models of patient dentitions are often required. In the present context, the term 'dental arch' should be understood broadly and comprises not only a complete arcus dentalis but also partial regions thereof. The term applies equally to tooth arrangement as such, as well as to the tooth-bearing structures (whether toothed or untoothed).

Physical models of dental arches often form the basis for dental lab adjustment work, which can be performed extraorally in this manner. Traditionally, physical models of dental arches are created by making an impression of the dental arch and casting the resulting impression. Virtual models, however, are increasingly gaining in importance as a preliminary step in or even an alternative to physical models. For example, a virtual model of a dental arch can serve as the basis for 3D printing of a physical dental arch model.

The underlying technology for creating virtual, three-dimensional dental arch models is known to one skilled in the art and is established in commercially available devices and is widely distributed. A plurality of images is captured of the dental arch being modelled from differing angles of view and then established triangulation algorithms are applied to compute the three-dimensional, virtual model. The details of the algorithms used, the specific parametrization of the modeled surfaces as well as the storage and display formats, which are generally known to one skilled in the art, play no role in the context of the present invention.

Usually the field of view of the intraoral camera used is relatively small, such that only a relatively small section of the imaged object can be recorded. Therefore, a large number of partially overlapping images are captured, which are then "superimposed on one another" with their overlapping regions during virtual modeling in order to generate a consistent imaging of the entire region of interest. This approach is generally referred to as "stitching." Minor errors, influenced by the finite pixel size of the camera used, among other factors, necessarily result during every instance of "stitching." These are known as "registration errors." When modeling large regions in particular, such as a complete dental arch, these registration errors can add up to orders of magnitude of multiple hundreds of microns, such that certain dimensions of the virtual model, such as the distance between two opposing molars, deviate from the true dimensions to the extent specified. From a medical perspective, deviations of this order of magnitude are not tolerable for the basis of dental work, especially so-called circumferential dental work.

The above, category-defining document discloses installing reference bodies with exactly known dimensions on the dental arch being modeled and mapping them together with the dental arch and modeling them virtually. The model can then be corrected such that the modeled dimensions of the reference body correspond exactly to their known, true dimensions, whereby the application of suitable interpolation and extrapolation algorithms simultaneously results in a corresponding correction of the modeled dental arch dimensions. With regard to this system, installing said reference body intraorally is disadvantageous, as this makes the entire procedure more laborious and unpleasant for the patient. Therefore, the cited document suggests modifying the method to make the complete impression of the dental arch being modeled in the usual way, to cast the mold and install the reference bodies on the resulting, physical model, which is then representatively mapped for the actual dental arch and virtually modeled. This approach appears not to be very expedient, however, at least in the cases in which a physical model is dispensed with or a virtual model is intended to serve as the basis for a physical model. In addition, the reference bodies are always contained in the virtual model itself and must be subsequently removed from the calculation. This leads to further inaccuracies, especially where an installed reference body obscures structural details of the dental arch and/or of the physical model.

The approach disclosed in DE 10 2014 102 770 A1 constitutes one alternative. Here as well, the complete impression is necessarily made of the dentition regions of interest in the registration material of a bite fork. Instead of the dental arch itself or a physical model produced on the basis of the impressions in the registration material, within the scope of this approach, it is the impressions in the registration material that are recorded by means of a scanner and used as the basis of the virtual dental arch model to be computed. Naturally, the above-described problem of error summation during "stitching" applies generally here as well. This is countered in the cited document by equipping the bite fork with uniquely identifiable reference markings, the relative positions of which are known and can be referenced to the recorded partial images, which show both parts of the impressions as well as parts of the markings. In addition the cited document also discloses the possibility of applying additional absolute position markers on the bite fork which allow for a position determination of the bite fork relative to an absolute coordinate system at the point in time when the impressions are made in the registration material, i.e. when the patient bites into the registration material of the bite fork, relative to which the head of the patient is positioned in a known (because measured) manner. In this way it is possible to reference the virtual model to the absolute coordinate system and therefore to specific anatomical features on the head of the patient. This is particularly important when dynamic processes, e.g. relative motion of the upper and lower jaw, are supposed to be simulated. This possibility plays no role, however, in the context of the present invention.

DE 20 2015 105 356 U1 and DE 10 2011 005 802 A1 also pursue essentially similar approaches in which exclusively the impressions in the registration material of a bite fork are scanned so as to produce an image. These approaches share the common disadvantage that the precision of the virtual model suffers insofar as it is not the object of interest as such, i.e. the dental arch itself, but rather a representative object that may have been created with errors, namely the impressions in the registration material, that is scanned and which serve as basis of the virtual model.

The problem that the present invention seeks to solve is to design a generic method for virtual modeling of a dental arch that is more precise and less unpleasant for the patient.

SUMMARY

One aspect of the invention is to separate the imaging necessary for virtual modelling of dental arches, on the one hand, and of reference bodies, on the other, physically (and preferably also temporally).

The imaging of the dental arch is done intraorally. The object being modeled is directly imaged itself, which excludes errors that could arise within the scope of interim steps. On the other hand, the imaging of the dental arch by means of an intraoral camera is a less unpleasant, minimally-invasive procedure for the patient.

The imaging of the reference body, conversely, is done extraorally. In particular, it is not necessary to affix the reference body to the dental arch itself. The exact dimensions of the reference body derive from the pattern, which is known (in its dimensions), of the impression plate. The pattern is preferably non-periodic, such that each pattern section appearing in any image of a partial region of the reference body can be unambiguously identified. The fact that the impression plate and/or its pattern is known means, in particular, that the distance of each pattern section from every other pattern section is known and/or can be determined from known information. If all imaged pattern sections can be uniquely identified—due to the non-periodicity—and therefore localized, their distances from one another and therefore the distances between the adjacent sections of the partial impression that are imaged along with the pattern can also be determined.

In principle, it is also possible to use a periodic pattern. In this case, however, the entire impression plate should be imaged when imaging the reference body so that each individual pattern position can be unambiguously identified—such as by "counting" the periods, starting from an identifiable starting point. In the preferred use of a non-periodic pattern, conversely, the imaging of isolated sections of the impression plate can suffice. This preference has especially advantageous effects for embodiments described in more detail below, in which the partial impression also only comprises isolated regions.

The images of the partial impression on the impression plate, for their part, form the interface to the images of the actual dental arch, since they represent the exact negative of certain partial regions of the dental arch. In the images of the dental arch, it is possible to identify those regions which are represented by the partial impression in the reference body and their distances from one another can be determined exactly due to the pattern. These exactly determined distances can then be transferred to the virtual dental arch model, such that registration errors that occurred during its computation can be corrected. At the same time, it is not necessary to produce a complete impression of the dental arch, which is unpleasant for the patient and which requires significant technical expertise. Rather, it is sufficient to make one flat partial impression, e.g. with a scannable bite registration material, which is less onerous for the patient.

The method according to the invention thus delivers a particularly high dimensional accuracy of the virtual model, in particular a correction (or—included by this term—an avoidance) of registration errors and minimizes at the same time the burden for the patient.

In one embodiment, the method according to the invention is executed in detail in that a virtual, three-dimensional, preliminary dental arch model is computed from the images of the dental arch captured intraorally, a virtual, three-dimensional reference model is computed from the images of the reference body captured extraorally, and to create the (final) dental arch model, the dimensions of the preliminary dental arch model are corrected based on dimensions, realized in the reference model, of those structural features which are present both in the preliminary dental arch model as well as in the reference model.

In other words, independently of one another, a preliminary dental arch model (namely on the basis of the intraorally captured dental arch images) as well as a reference model (on the basis of the extraorally captured reference body images) are computed first. The preliminary dental arch model contains all structural details of the dental arch, but also the registration errors explained above. Conversely, the reference model is correct with regard to dimensions; however, it only contains few structural details. In a correction step, both models are virtually "superimposed over one another," whereby the preliminary dental arch model is compressed, extended and/or twisted such that the structural details contained in both models correspond precisely in position and orientation. One can presume that the structural details lying between these reference points and which are only contained in the preliminary dental arch model, are also correctly positioned and oriented. The resulting, final dental arch model is characterized by an especially high level of detail and especially high dimensional accuracy.

As explained, the reference model contains the required, precise dimensional information, namely on the basis of the precisely known pattern on the impression plate. Conversely, the dimensions of the partial impression on which, as explained above, the actual correction of the preliminary dental arch model is based, are not known a priori. In particular, the computation of a model of the reference body is fundamentally subject to the same registration error as the computation of a model of any given other body, in particular that of the dental arch. Various paths are conceivable for arriving at a reference model with precisely known dimensions of the partial impression that can be used within the scope of the method according to the invention. Preferably it is provided that first a preliminary reference model is computed from the images of the reference body, and to create the (final) reference model, the dimensions of the preliminary reference model are corrected based on dimensions, realized in a saved, virtual, three-dimensional plate model of the impression plate, of those pattern features that are present both in the preliminary reference model as well as in the plate model.

In other words, two models are initially computed here as well. The preliminary reference model is subject to the registration error; however, it contains all structural details of the partial impression as well as of the impression plate, in particular its pattern. Conversely, the plate model of the impression plate is not subject to any registration error. For example, it can rest on the basis of a precision measurement performed using special measuring machines. However, it does not contain any structural information about the partial impression, rather merely the (dimensionally accurate) structural details of the impression plate, in particular its pattern. Then in a correction step, both models are "superimposed over one another," whereby the preliminary reference model is compressed, extended and/or twisted such that the pattern details contained in it correspond precisely to the pattern details of the plate model. It can then be expected that the structural details of the structures not contained in the plate model, i.e. especially the structures of the partial impression, are also precisely positioned and oriented. This corrected model can then be used as the (final) reference model for the above-explained correction of the preliminary dental arch model.

As explained, the non-periodicity of the pattern on the impression plate is favorable for the efficiency of the method according to the invention. In an especially advantageous embodiment, the pattern of the impression plate is even composed of statistically distributed pattern elements. It is not necessary, in particular, for the pattern to be designed according to a (non-periodic) schema, of whatever kind. The essential factor is the precise knowledge of the realized pattern, not however the knowledge of how it was created. At the same time, such additional information about a generation schema can be used, for example for the definition of the above-explained plate model, which with knowledge of the production schema can also be generated in purely theoretical ways without the above-mentioned precision measurement.

It is advantageous for the pattern of the impression plate to be designed as a relief. With this approach, it is not necessary for the modeling algorithms to distinguish qualitatively between pattern details and partial impression details. As a result, the calculations required in the scope of the modeling are made simpler than in cases—which are entirely realizable—in which the pattern is of a purely optical nature.

In the context of a relief-type pattern, it has been shown to be especially advantageous when the relief has ball segments of different radii and/or different heights. Ball segments are easily produced pattern elements that do not contain, in particular, any undercuts or mutual coverings, such that it is possible to perform their capture in an image and their virtual modeling especially easily and seamlessly. Moreover, the parameters "segment height" and "radius" provide two additional criteria for pattern generation with unambiguously localizable pattern sections.

The partial impression on the impression plate preferably is composed of multiple simultaneously impressed partial impression elements arranged in isolated fashion on the impression plate. These partial impression elements serve as reference points for subsequent computations. Between them, however, the impression plate and in particular, its pattern, remain recognizable for image recording. The more structural details of the partial impression elements that can be imaged together, directly adjacent, to structural details of the pattern on one image, the more precisely the position and orientation of the structural details of the partial impression elements can be modeled, i.e. the more precise the reference model.

As already mentioned above, the reference body can be produced very easily and less inconveniently for the patient. Preferably, for producing the reference body, it is provided that an impression body comprising the impression plate loaded with deformable impression material in sections is pressed against the dental arch from an occlusal direction. In particular, it is regarded as favorable for the impression body to be formed from the impression plate loaded with portions of deformable impression material arranged in isolated portions. This method essentially corresponds to the traditional impressing of dental arches, however, it differs from this in terms of the significantly reduced amount of impression material. Only small portions of impression material are distributed at a few, isolated positions on the impression plate and this impression body is briefly pressed against the dental arch. Differently than with a complete impression, this partial impression can be accomplished quickly and technically easily, and due to the significantly reduced volume compared to a traditional impression tray, does not cause the patient any unpleasant side effects, such as gagging, etc.

The selection of the specific impression material is largely left up to the user of the method according to the invention. It is conceivable to use a curing impression material and to allow it to cure before capturing the images of the reference body. During curing, however, undesirable shrinkages, and therefore, dimensional errors, may occur. Since the partial impression within the scope of the method according to the invention is not exposed to any mechanical load, however, but is recorded purely optically, it is also possible to use a permanently elastic impression material. After performing the method according to the invention, such a material can generally be easily removed again from the impression plate, which can then be made available for the production of a new reference body.

Additional features and advantages of the invention derive from the following specific description and drawings.

BRIEF DESCRIPTION OF THE DRAWINGS

FIGS. 1a and 1b illustrate a first step of an exemplary embodiment of the method according to the invention.

FIG. 2 illustrates a second step of an exemplary embodiment of the method according to the invention.

FIGS. 3a and 3b illustrate a third step of an exemplary embodiment of the method according to the invention.

DETAILED DESCRIPTION

Figure 4:
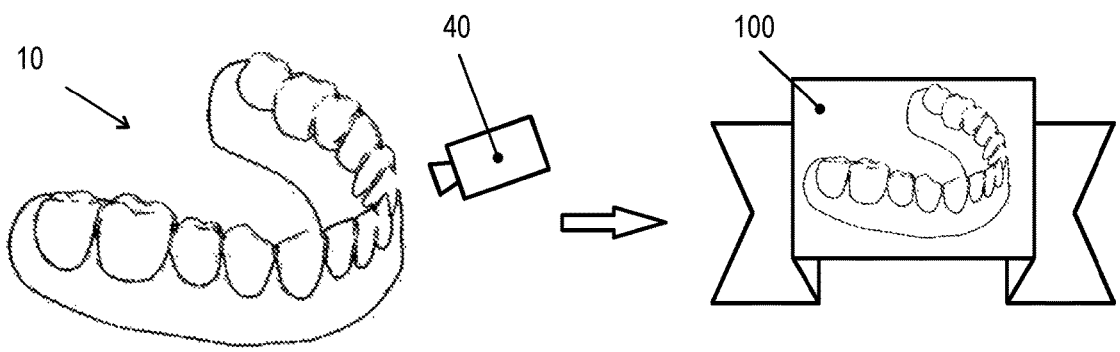
FIG. 4 illustrates a fourth step of an exemplary embodiment of the method according to the invention.

Identical reference symbols in the figures indicate identical or analogous elements.

FIGS. 1 to 6 show an advantageous embodiment of a method according to the invention for virtual modeling of a dental arch 10. In Sub-FIG. 1a, the dental arch 10 is shown in isolated fashion. This serves only the purposes of clarity of the drawings, however. The method according to the invention relates in particular to the modeling of a dental arch 10 in situ. Sub-FIG. 1b shows an impression body 20, such as is preferably used in the context of the method according to the invention. The impression body is composed of an impression plate 22, that bears a non-periodic relief-type pattern, which is preferably composed of statistically distributed pattern elements, especially preferably of ball segments with different radii and/or different heights.

On the impression plate 22, multiple—four in Sub-FIG. 1b—portions 24 of deformable impression material are positioned in isolated fashion from one another. A handle 26 on the impression plate 22 facilitates handling of the impression body 20.

As suggested in FIG. 2, the impression body 20 is pressed onto the dental arch from the coronal direction and then lifted off again.

As shown in FIG. 3, at the beginning of the actual modeling procedure, the dental arch 10 being modeled (Sub-FIG. 1a) as well as a reference body 30 (Sub-FIG. 1b) are thereby provided. The latter essentially comprises the impression plate 22 and a partial impression 32 of the dental arch 10, whereby the partial impression 32 represents the negative of the dental arch 10 in those areas in which the impression material was in contact with the dental arch 10 during the impression step of FIG. 2.

In the following step, shown in FIG. 4, overlapping images of the dental arch 10 are captured from different viewing directions by means of an intraoral camera 40. From these, a three-dimensional, virtual model of the dental arch 10 is computed in the usual manner, preferably by "stitching," which virtual model is here referred to as preliminary dental arch model 100. The preliminary dental arch model 100 contains the registration errors that are unavoidable with such modeling procedures.

Figure 5:
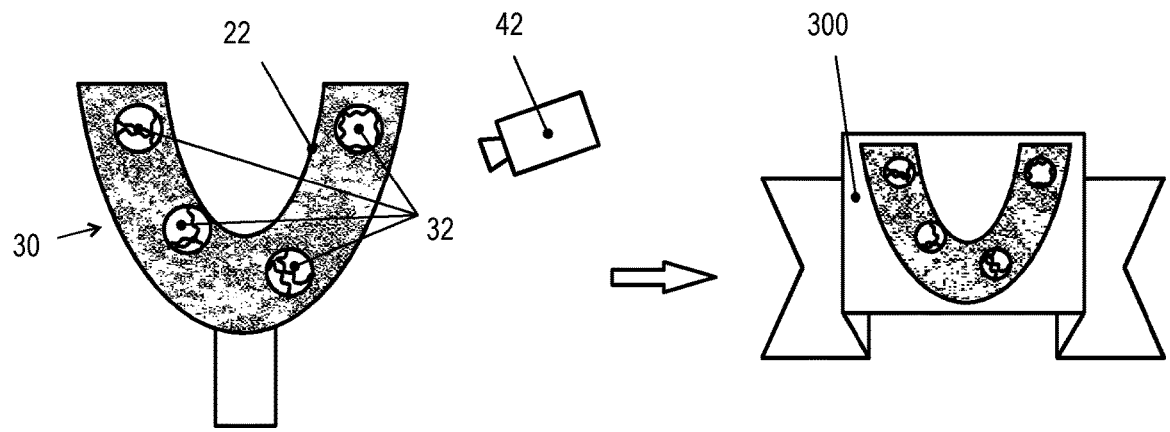
FIG. 5 illustrates a fifth step of an exemplary embodiment of the method according to the invention.

In the step shown in FIG. 5, which can be performed before, after or simultaneously with the step shown in FIG. 4, the reference body 30 is imaged by means of an extraoral camera 42. The extraoral camera 42 can be the same device as the intraoral camera 40, whereby in one case it is used intraorally and in the other case extraorally. Here as well, a plurality of overlapping images is captured from different viewing directions. In particular, the partial impression 32 as well as the pattern of the impression plate 22 are captured. The pattern of the impression plate 22 is known in detail. Therefore, a reference model 300, which is computed from the captured images of the reference body 30, can be designed with exact dimensional accuracy.

Figure 6:
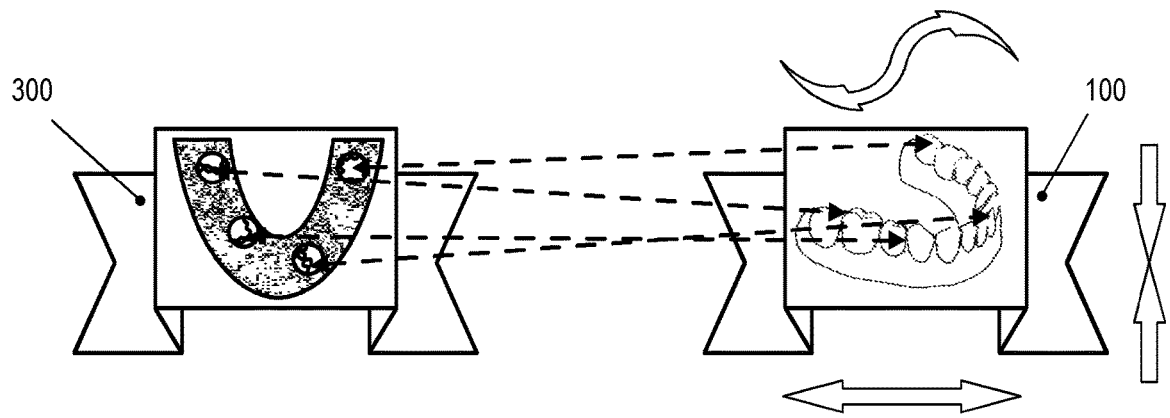
FIG. 6 illustrates a sixth step of an exemplary embodiment of the method according to the invention.

In the final step, shown in FIG. 6, a correction of the preliminary dental arch model 100 is performed by comparison with the reference model 300. In particular, the preliminary dental arch model 100 is computationally compressed, extended and/or twisted such that regions of the preliminary dental arch model 100, which correspond to partial impression regions of the reference model 300, are adjusted to the latter with regard to their position and orientation. In this manner, the registration error in the preliminary dental arch model 100 can be corrected and an exactly dimensionally accurate, final dental arch model (not shown separately in the figures) can be generated. This can then serve as the basis for additional dentistry or dental lab measures. For example, it can be used as part of 3D printing of a dimensionally accurate physical dental arch model on which then even circumferential dental prosthetics can be precisely produced. Alternatively, the dimensionally accurate virtual dental arch model can be directly used to produce (circumferential) dental prosthetics.

Figure 7:
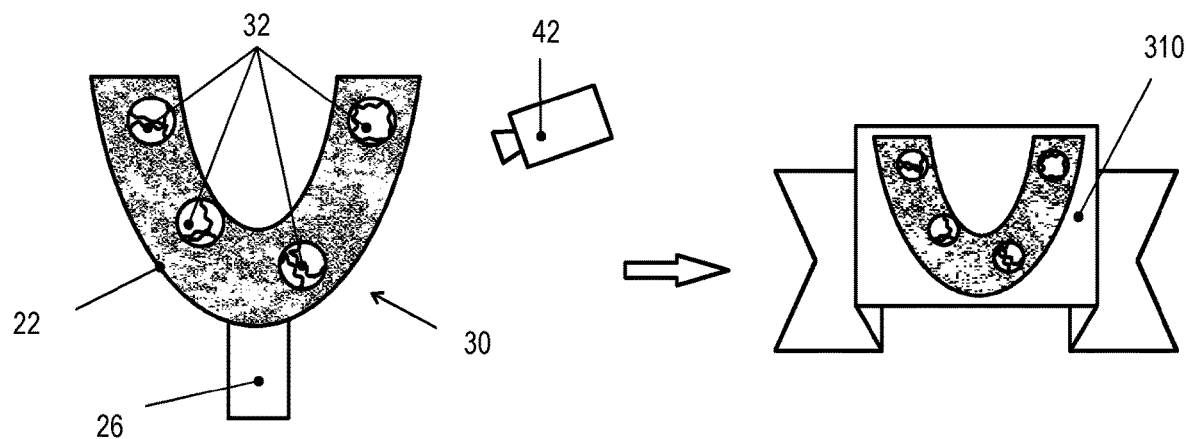
FIG. 7 illustrates a first step of an especially advantageous further development of the method according to the invention.
Figure 8:
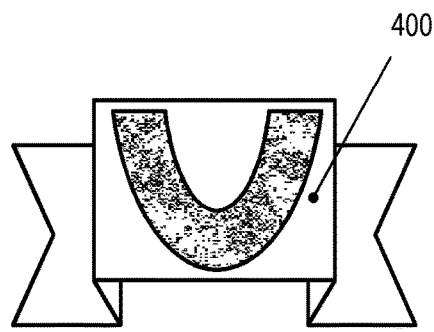
FIG. 8 illustrates a second step of an especially advantageous further development of the method according to the invention.
Figure 9:
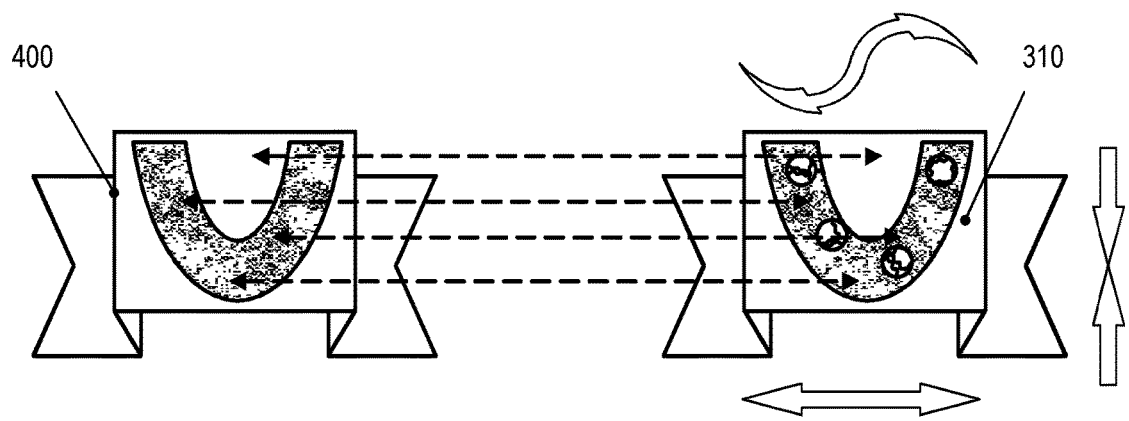
FIG. 9 illustrates a third step of an especially advantageous further development of the method according to the invention.

FIGS. 7 to 9 sketch especially preferred steps to create the dimensionally accurate reference model 30. As shown in FIG. 7, for this purpose the reference body 30 is imaged by means of an extraoral camera 42 and from this, using standard modeling procedures, a preliminary reference model 310 is computed. This preliminary reference model 310 is still subject to the unavoidable registration error as in standard modeling procedures.

According to FIG. 8, however, an exact plate model 400 of the impression plate 22 is prepared. This can be created by means of a precision measuring machine that does not generate any noteworthy registration error. Such precision measuring machines are known to one skilled in the art. In particular, by capturing very large images that image the entire impression plate 22 and dispense with "stitching," the registration error can be avoided. Such precision measuring machines are expensive, however, and highly complex to operate and are typically not available in dentistry or dental lab settings. The patterned impression plates used in executing the method according to the invention should therefore preferably already be measured by the manufacturer and delivered together with a data set representing the dimensionally accurate plate model 400.

Analogous to the comparison step of FIG. 5, a comparison, as shown in FIG. 9, of the preliminary reference model 310 to the dimensionally accurate plate model 400 can be performed. In that process, the preliminary reference model 310 is compressed, extended and/or twisted such that the pattern regions modeled in both models correspond exactly. In this manner, the final reference model 300 is produced, which can be used as a dimensionally accurate reference model 300 in the comparison step of FIG. 6.

Of course, the embodiments discussed in the specific description and shown in the Figures are only illustrative exemplary embodiments of the present invention. The present disclosure gives a person skilled in the art a broad spectrum of possible variations to work with. In particular, the functional method stages described here as individual steps can be executed together, at least in part, when suitable algorithms are used.

LIST OF REFERENCE NUMBERS

10 dental arch
20 impression body
22 impression plate
24 portions of impression material
26 handle
30 reference body
32 partial impression
40 intraoral camera
42 extraoral camera
100 preliminary dental arch model
300 reference model
310 preliminary reference model
400 plate model

The invention claimed is:

1. A method for virtually modeling a dental arch (10), wherein a plurality of overlapping images of the dental arch (10) and of a reference body (30) are captured from different angles of view and a virtual, three-dimensional dental arch model is computed from the captured images,
wherein a partial impression (32) of the dental arch (10) on an impression plate (22) of known dimensions is used as the reference body (30), which impression plate (22) is provided with a pattern, and wherein the method further includes:
computing a virtual, three-dimensional, preliminary dental arch model (100) from images of the dental arch (10) that have been captured intraorally,
computing a virtual, three-dimensional reference model (300) from images of the reference body (30) that have been captured extraorally, and
creating a dental arch model by correcting dimensions of the preliminary dental arch model (100) based on dimensions, realized in the reference model (300), of those structural features that are present both in the preliminary dental arch model (100) as well as in the reference model (300).

2. The method according to claim 1, wherein
the pattern is a non-periodic pattern.

3. The method according to claim 1, further comprising:
computing a preliminary reference model (310) from the images of the reference body (30), and
to create the reference model (300), the method further includes correcting the dimensions of the preliminary reference model (310) based on dimensions, realized in a saved, virtual, three-dimensional plate model (400) of the impression plate (22), of those pattern features that are present both in the preliminary reference model (310) as well as in the plate model (400).

4. The method according to claim 1, wherein
the pattern of the impression plate (22) is composed of statistically distributed pattern elements.

5. The method according to claim 1, wherein
the pattern of the impression plate (22) is structured as a relief.

6. The method according to claim 5, wherein
the relief has ball segments of differing radii and/or differing heights.

7. The method according to claim 1, wherein
the partial impression (32) is composed of a plurality of simultaneously impressed partial impression elements that are arranged in isolated fashion on the impression plate.

8. The method according to claim 1, wherein
to produce the reference body (30), the method further includes pressing an impression body (20) against the dental arch (10), the impression body (20) comprising the impression plate (22) with deformable impression material (24) arranged in sections, and the pressing of the impression body (20) against the dental arch (10) being carried out from the occlusal direction.

9. The method according to claim 8, wherein
the impression body (20) that comprises the impression plate (22) with the deformable impression material (24) arranged in sections has portions of the deformable impression material (24) arranged in an isolated fashion on the impression plate (22).

* * * * *